3,146,246
ESTERIFICATION EMPLOYING SOLID DISPERSED CATALYST

Judson E. Goodrich, San Rafael, Calif., assignor to California Research Corporation, San Francisco, Calif., a corporation of Delaware
No Drawing. Filed Mar. 30, 1962, Ser. No. 183,768
6 Claims. (Cl. 260—410.9)

This invention pertains to esterification reactions. More specifically, this invention involves the use of a solid sulfuric acid catalyst composition in esterification reactions.

Carboxylic acids can be directly esterified with an alcohol in the presence of a catalyst such as sulfuric acid or sulfonated hydrocarbons. Carboxylic acids also form tertiary esters from olefins in the presence of sulfuric acids.

One problem with conventional sulfuric acid catalyzed esterification reactions has been the hard to control reactions. Another has been the residuary contamination and purification of the end product. It has also been difficult to recover and reuse the sulfuric acid catalyst.

It has now been found that a new and improved esterification reaction is provided by the process which comprises carrying out said esterification reaction in the presence of a microdispersed solid, infusible, easily separable catalyst composition prepared by the reaction of an aromatic compound selected from the group consisting of benzene and substituted benzene compounds, said substituents being selected from the class consisting of lower alkyl radicals, phenyl and lower alkyl phenyl radicals; an aldehyde selected from the class consisting of formaldehyde, paraformaldehyde and methylal; and concentrated sulfuric acid; the reaction being carried out by intimately mixing said components in a solvent containing a dispersant and maintaining a temperature not exceeding 120° F.

According to the present invention, the novel solid sulfuric catalyst enables one to eliminate the above-mentioned shortcomings inherent in the use of sulfuric acid. The reactions involving sulfuric acid may now be easily controlled by means of the novel solid sulfuric acid catalyst. Additionally, the problem of residuary contamination is minimized by use of the acidic formolite resin, since the active sulfuric acid is not introduced directly in the solution. Furthermore, the resin is easily separable from the reaction solution and can be reused if rejuvenated with additional sulfuric acid.

Acidic formolite resins according to the invention are prepared by reacting an aromatic hydrocarbon, an aldehyde and sulfuric acid.

Suitable aromatic compounds are selected from the class consisting of benzene and mono-, di- or tri-substituted benzenes, naphthalene, alkyl naphthalenes, and phenanthrenes. The substituents are selected from the class consisting of lower alkyl radicals of from 1 to 6 carbon atoms, phenyl radicals and alkyl phenyl radicals. Other substituents are aliphatic ethers, e.g. alkyl ethers wherein the alkyl moiety is from 1 to 6 carbon atoms. Benzene and lower alkyl disubstituted benzene compounds are preferred. Examples of suitable aromatic compounds are benzene, n-butyl benzene, toluene, o-xylene, m-xylene, p-xylene, biphenyl, cumene and p-cymene, naphthalene, mono-, di- and trinuclear alkyl ethers such as anisole; α-methyl naphthalene and phenanthrene.

Suitable aldehydes are selected from the class consisting of formaldehyde, paraformaldehyde, metaformaldehyde, hemi-formals and monohydroxy or polyhydroxy alcohol reaction product with formaldehyde. Examples of homologous acyclic products are methylal and ethylal. Cyclic reaction products of from 3 to 6 carbon atoms in a ring are included. Examples of suitable cyclic compounds are 1,3-dioxolanes, 1,3-dioxanes, and higher ring homologous thereof. Formaldehyde is the preferred component.

The strength of sulfuric acid should be above 90 percent. Preferably, the sulfuric acid has a concentration of from 90 to 97% by weight. A dilution effect on sulfuric acid during the reaction should be compensated by using stronger acid or adding stronger acid portionwise.

The mol ratio of formaldehyde to aromatic hydrocarbon may vary from 0.25 to about 2.5. It is desirable to use more than 1.5 mols of formaldehyde per mol of the aromatic constituent. A lesser amount will give lower yields of the resin.

The sulfuric acid is employed in excess over the amount needed for the resin in order that the acidic resin contain active sulfuric acid. From 1 mol to 10 mols of sulfuric acid to 1 mol of aromatic hydrocarbon may be employed.

The preparation of the acidic resin is carried out by intimately mixing the above components in a suitable solvent in the presence of a dispersant. Effective solvents are chlorinated hydrocarbons such as carbon tetrachloride, trichloroethane, trichlorohexane, trichloroheptane. In addition to solubilizing, the solvents serve to minimize the sulfonation of the aromatic compound, thus favoring the resin formation. Other suitable solvents are cracked naphtha and saturated hydrocarbon solvents, such as hexane, heptane, Pearl oil.

The formation of acidic formaldehyde resin proceeds by emulsion resinification mechanism, and, therefore, requires the use of a dispersant as already mentioned. Generally, dispersants which aid in reducing the sulfuric acid droplet size are suitable. Useful dispersants are copolymers such as a condensation product of maleic anhydride and alkyl methacrylate (the ester alkyls are of $C_{10}$ to $C_{13}$ carbon atoms); a copolymer of an alkyl methacrylate and methacrylic acid, and polyglycol methacrylates. The polyglycols are polyethylene glycol, polypropylene glycol and other homologous branched and straight-chain glycols. Examples of suitable polymers are found in U.S. Patents 2,892,779, 2,892,783 and 2,892,818.

Other dispersants are metal sulfonates, such as calcium petroleum sulfonates, or more broadly alkaline metal petroleum sulfonates and alkaline metal alkyl benzene sulfonates. Still others are low molecular weight cationic detergents, such as partially dehydrated triamide reaction product of tetraethylene pentamine and branched-chain octadecanoic acid; quaternary alkyl ammonium compounds; and alkyl esters of glycerine, and alkenyl succinic anhydride.

The dispersant is used in an amount sufficient to emulsify the sulfuric acid in the solvent. The amount may vary with the particular dispersant employed. Generally, it is from 0.1 to 1.0 volume percent based on the solvent.

In order to synthesize the resinous lattice, catalysts such as sulfuric and hydrofluoric acids are employed. To prepare the acidic formolite resin in one step, an excess amount of sulfuric acid is used. It acts first as a catalyst, while the excess is incorporated in the resinous lattice. If hydrofluoric acid is used initially, sulfuric acid is added subsequently to produce the finished sulfuric acid resin. Sulfuric acid is also used to regenerate the acidic formolite resin to its original strength, if desired.

It is important that the temperature of the reactants be below 120° F. From 35° F. to 120° F. is an acceptable working range. The preferred operating temperature is below about 90° F.

It is essential that the reaction components be thoroughly and intimately mixed during the reaction in order to obtain a finely divided product.

Prior to the present invention the conventional reaction of the formaldehyde and aromatic hydrocarbons was described in the art. Products from this reaction are unusable and unadaptable for the present purpose. Nastyukov, J. Russ, Phys. Chem. Soc., vol. 35, p. 824 (1903), called the reaction of formaldehyde and an arene (an aromatic compound) a "formolite reaction," and the products have been called since then "formolite resins."

Two distinct types of resins result from the prior art reaction. One of the resinous products is a high melting substantially oxygen-free resin soluble in most organic solvents and melting at about 200° F. The second product is an infusible resin, generally, insoluble in all common solvents and containing oxygen.

The sulfuric acid formolite resin of this invention is a black granular solid. It absorbs moisture the same as sulfuric acid. It can be titrated with a base. When stored in a desiccator for a prolonger period, some $SO_2$ is given off. The indication is that sulfuric acid oxidizes the supporting organic matter. If the sulfuric acid was chemically bound, it would generally not oxidize the support material. Neutralizing the sulfuric acid formolite resin with with a base changes its color to tan. In its neutralized state the resin is a talc-like powder, stable up to about 700° F. in air. Above this temperature the resin sinters and darkens. The neutralized benzene formaldehyde resin (the lattice) has a surface area of approximately 110 m.$^2$/gr. According to nitrogen adsorption measurements, the individual particles are less than 0.1 micron in diameter, but tend to form clusters several microns in size. The ash content of the neutralized resinous lattice is about 0.1%. Active sulfuric acid up to about 80% by weight is incorporated in the resin. This composition will not attack a filter paper while compositions with higher sulfuric acid content will destroy the paper.

It is not known exactly by what mechanism the sulfuric acid is held in the resinous aromatic-formaldehyde lattice. It appears to be a different mechanism than that of cationic exchange resins, because most polar solvents will elute the labile sulfuric acid from the matrix. Simple hydrocarbon solvents like hexane, however, will not dislodge the sulfuric acid from the resin support. Upon neutralization the acid is removed from the resin.

Because of its organic nature, the acidic formolite resins are restricted to reaction temperatures up to about 500° F. The formolite resin support is inert and does not interfere with the esterification reactions.

Typical preparations of the new sulfuric acid composition are illustrated in the following examples. Unless otherwise specified, the proportions are on a weight basis.

EXAMPLE I

Carbon tetrachloride (640 ml.), benzene (82.7 g.), concentrated sulfuric acid (686 g. of 95.5–96.5%) and calcium petroleum sulfonate (2 g., derived from a lubricating oil having a viscosity of 480 SSU at 100° F.) were introduced into a vessel and vigorously agitated. 44.0 g. of paraformaldehyde (1.5 mols) was slowly added, keeping the temperature below about 90° F. The product was filtered and washed with benzene. The filtrate was neutral. The acid was all retained in the black solid precipitate. The yield of the wet product was 867.9 g., 11.9% of the product was solvent; 9.2% resin and 78.9% sulfuric acid.

EXAMPLE II

A mixture of 41.4 g. benzene (0.53 mol), 345 g. of 96% sulfuric acid, 1 g. of calcium petroleum sulfonate (derived from lubricating oil having a viscosity of 480 SSU at 100° F.) and 960 ml. of $CCl_4$ were introduced into a vessel having means for vigorous agitation. To the rapidly stirred mixture was added dropwise 60 g. of 38% formaldehyde (0.76 mol). The reaction temperature was kept below about 90° F. The resulting thick reddish-black slurry was filtered, and washed with water. The catalyst is then ready for use in esterification reactions.

EXAMPLE III

A mixture of 44 g. benzene (0.56 mol), 200 ml. of 98% sulfuric acid, 16 ml. of a copolymer of lauryl methacrylate and maleic anhydride having a molecular weight of about 100,000 (25% in $CCl_4$) were introduced into a vessel having means for vigorous agitation. To the rapidly and violently stirred mixture was added dropwise 62.0 g. (0.82 mol) of methylal. The reaction temperature was kept below about 90° F. At the conclusion of the reaction, the product was filtered directly through a Fiberglas filter. The filtrate was clear and homogeneous and consisted of about 600 ml. of carbon tetrachloride. The recovered filter residue contained 90.5% of the benzene charged.

As acid esterification reactants, organic monocarboxylic acids, such as fatty acids etc., are suitable. Aromatic acids as well as substituted carboxylic acids may serve as precursors for the esters.

Monocarboxylic and polycarboxylic aromatic and aliphatic acids are within the scope of the invention. Examples of illustrative acids are acetic, butyric, lauric, capric, stearic, oleic, acrylic, methacrylic, benzoic, lactic, tartaric, naphthoic, oxalic, maleic, adipic, pimelic, sebacic, phthalic, succinic, 1,2,4-butentricarboxylic, glutaconic, tetrachlorophthalic acids, and others.

Alcohols useful for the esterification are aliphatic and aromatic alcohols. Aliphatic alcohols are preferred. Illustrative alcohols are methyl alcohol, ethyl alcohol, butyl alcohol and the higher homologous alcohols, and arene alcohols such as benzyl alcohols and homologues thereof. Saturated and unsaturated cyclic alchols of from 4 to 8 carbon atoms in the ring such as cyclobutanol and cyclohexanol are suitable. Saturated and unsaturated cycloaliphatic alcohols of from 3 to 6 carbon atoms in the ring containing oxygen, sulfur and nitrogen are included.

Monohydric and polyhydric straight and branched chain aliphatic alcohols are included, e.g., glycols such as ethylene glycol, propylene glycol, dihydroxy alkyl and akyl ether-alkyl hydroxy compounds, wherein the alkyl moiety contains up to 10 carbon atoms. Unsaturated alcohols are within the scope of the invention.

Typical esterification reactions according to this invention using the new sulfuric acid catalyst are illustrated by the following examples.

Preparation of n-Butyl Oleate

A flask equipped with a stirrer, reflux condenser and water take-off was charged with oleic acid, n-butanol and toluene solvent. Subsequently, the esterification catalyst was added, the solution heated to reflux, and the rate of water formation measured.

The following table shows the results obtained according to the procedure above.

TABLE I

|  | Example I | Example II |
|---|---|---|
| Oleic acid, 97% | 72.8 g. (0.25 mol) | 72.8 g. |
| n-Butanol | 20.4 g. (0.275 mol) | 20. 4 g. |
| Toluene | 100 ml | 100 ml. |
| Acidic formolite resin of Example II. |  | 2.4 g. (75% $H_2SO_4$). |
| $H_2SO_4$ (95.5–96.5%) | 1.65 g |  |
| Water removed | 6.0 ml./80 min | 6.0 ml./50 min. |
| Appearance of product during reaction. | Mixture very dark after 15 min. | Mixture darkened some after 20–30 min. At completion of reaction lighter than in Example I. |
| Yield | 84.2 g | 85.0 g. |
| Theoretical yield | 84.7 g | 84.7 g. H |

The above table illustrates the rate of esterification is better when acidic formolite resin is used. Better yields and quality of ester as indicated by color of the product were also obtained by means of the resin catalyst.

Following the procedure above, it was found that in esterification of methacrylic acid with ethylene oxide condensation product, a lighter colored compound was obtained using acidic formolite resin catalyst instead of sulfuric acid. A more desirable product was produced in addition to easy filtration of catalyst. No neutralization of the copolymer solution was required.

*Preparation of a 2,4-D Derivative*

The same procedure was employed as in the n-butyl oleate production. The following table embodies the data and the results obtained.

TABLE II

|  | Example I | Example II |
|---|---|---|
| 2,4-Dichlorophenoxyacetic acid | 22.1 g | 22.1 g. |
| Tetrahydrofurfuryl alcohol | 10.7 g | 10.7 g. |
| p-Toluene sulfonic acid | 0.2 g |  |
| Acidic formolite resin |  | 0.28 g. |
| Water removed/time (Theoretical 1.8 ml.) | 00.5 ml./50 min. | 1.25 ml./50 min. |
|  | 0.85 ml./100 min. | 1.75 ml./100 min. |

The above experiment shows that the rate of reaction is faster for the acidic formolite resin.

The use of the new acidic formolite resins is generally applicable to all esterification reactions, and wherever the prior art has encountered problems using sulfuric acids, the catalyst of the present invention now gives an alternate synthesis approach.

This application is a continuation-in-part of my copending application Serial No. 88,275, filed February 10, 1961.

I claim:

1. In the sulfuric acid esterification of organic carboxylic acids with aliphatic alcohols, the improvement which comprises carrying out said esterification reaction in the presence of a microdispersed solid, infusible, easily separable catalyst composition prepared by the reaction of an aromatic compound selected from the group consisting of benzene and substituted benzene compounds, said substituents being selected from the class consisting of lower alkyl radicals, phenyl and lower alkyl phenyl radicals; an aldehyde selected from the class consisting of formaldehyde, paraformaldehyde and methylal, the mole ratio of aldehyde to aromatic compound being from 0.25 to about 2.5; and concentrated sulfuric acid in an amount in excess of that necessary to form a resin of the aromatic compound and aldehyde, the strength of said sulfuric acid being above 90%; the reaction being carried out by intimately mixing said components in a solvent containing a dispersant in an amount sufficient to emulsify the sulfuric acid in the solvent and maintaining a temperature not exceeding 120° F.

2. In the esterification of aliphatic organic carboxylic acids with aliphatic alcohols according to claim 1, the process wherein the solid sulfuric acid composition is recovered without neutralizing the same.

3. In the esterification of aliphatic organic carboxylic acids with aliphatic alcohols according to claim 1 wherein the solid sulfuric acid catalyst composition is recovered by means of gravitational separation.

4. In the esterification of aliphatic organic carboxylic acids with aliphatic alcohols according to claim 1 wherein the organic carboxylic acid is oleic acid, and the aliphatic alcohol is n-butyl alcohol.

5. In the esterification of aliphatic organic carboxylic acid with aliphatic alcohols according to claim 1 wherein the sulfuric acid catalyst is prepared from benzene, formaldehyde and 95.5–96.5% concentrated sulfuric acid.

6. In the esterification of aliphatic organic carboxylic acids with aliphatic alcohols according to claim 1 wherein the catalyst composition is prepared at a temperature not exceeding 90° F.

No references cited.